(12) United States Patent
Yim et al.

(10) Patent No.: US 8,222,361 B2
(45) Date of Patent: Jul. 17, 2012

(54) ETHYLENE-PROPYLENE-DIENE COPOLYMER PRODUCTION METHOD

(75) Inventors: Byoungtak Yim, Daejeon (KR); Youngwook Kim, Daejeon (KR); Myungahn Ok, Daejeon (KR); Jongsok Hahn, Daejeon (KR); Dongcheol Shin, Daejeon (KR)

(73) Assignees: SK Innovation Co., Ltd. (KR); SK Global Chemical Co., Ltd. (KR)

( * ) Notice: Subject to any disclaimer, the term of this patent is extended or adjusted under 35 U.S.C. 154(b) by 0 days.

(21) Appl. No.: 12/991,818

(22) PCT Filed: Dec. 21, 2009

(86) PCT No.: PCT/KR2009/007643
§ 371 (c)(1),
(2), (4) Date: Nov. 9, 2010

(87) PCT Pub. No.: WO2010/079906
PCT Pub. Date: Jul. 15, 2010

(65) Prior Publication Data
US 2011/0065877 A1  Mar. 17, 2011

(30) Foreign Application Priority Data
Jan. 6, 2009  (KR) .......................... 10-2009-0000748

(51) Int. Cl.
*C08F 4/6592* (2006.01)
*C08F 236/02* (2006.01)
*C08F 236/04* (2006.01)
*B01J 31/22* (2006.01)

(52) U.S. Cl. ........ 526/339; 526/133; 526/160; 526/165; 526/172; 526/943; 502/103; 502/152

(58) Field of Classification Search .................. 526/133, 526/160, 165, 172, 348, 943, 339; 502/103, 502/152
See application file for complete search history.

(56) References Cited

U.S. PATENT DOCUMENTS

| 2003/0060578 A1* | 3/2003 | Schiffino et al. | 526/114 |
| 2006/0111525 A1* | 5/2006 | Hanaoka et al. | 526/127 |
| 2007/0004586 A1* | 1/2007 | Woo et al. | 502/117 |
| 2007/0249490 A1* | 10/2007 | Ok et al. | 502/152 |
| 2007/0255023 A1* | 11/2007 | Razavi et al. | 526/114 |

FOREIGN PATENT DOCUMENTS

| JP | 2003-231693 | 8/2003 |
| KR | 10-0252074 | 1/2000 |
| KR | 10-2001-0052873 | 6/2001 |
| KR | 10-0639696 | 10/2006 |
| KR | 10-2007-0029565 | 3/2007 |
| KR | 10-2007-0104845 | 10/2007 |
| WO | 2007/136494 | 11/2007 |
| WO | 2008/047957 | 4/2008 |

OTHER PUBLICATIONS

International Search Report—PCT/KR2009/007643 dated Jul. 8, 2010.
Korean Office Action—Korean Application No. 10-2009-0000748 issued on Oct. 12, 2011, citing KR 10-2001-0052873, KR 10-0252074, and KR 10-0639696.

\* cited by examiner

*Primary Examiner* — Caixia Lu
(74) *Attorney, Agent, or Firm* — Cantor Colburn LLP

(57) ABSTRACT

The present invention relates to a method for the production of an ethylene/propylene/diene copolymer by means of solution polymerization, and more specifically one for a copolymer whose main components are ethylene, propylene and diene monomers using a catalyst of a transition metal coordination compound; the constituent components and characteristics of the copolymer being as follows. The catalyst composition provided by the present invention, which is used to produce a copolymer of which (a) the ethylene content is from 30 wt. % to 80 wt. %, (b) the propylene content is from 19.9% to 60 wt. % and (c) the diene content is from more than 0 wt. % to 15 wt. %, comprises a catalyst system using an activating agent of a compound of aluminum or boron, or aluminoxane together with a transition metal catalyst comprising at least one anionic ligand having an aryloxy group substituted with an aryl derivative in the ortho position and a cyclopentadiene derivative, and provides a highly active polymerization method with outstanding reactivity with respect to ethylene, propylene and diene compounds.

12 Claims, No Drawings

ETHYLENE-PROPYLENE-DIENE COPOLYMER PRODUCTION METHOD

BACKGROUND OF THE INVENTION

1. Field of the Invention

The present invention relates to a method of producing an ethylene-propylene-diene copolymer, and more particularly, to a method of producing an ethylene-propylene-diene copolymer by using a metallocene compound found in the transition metal of the fourth group of the periodic table as a catalyst.

2. Description of the Related Art

Since the properties, such as thermostability, an antiweatherability, and an ozone resistance, of an ethylene-propylene-diene copolymer are superior to a styrene-butadiene rubber and a butadiene rubber, it is frequently used as a material in the fields of automobile, architecture, and industry. When conventionally producing the ethylene-propylene-diene compolymer, a so-called Ziegler-Natta catalyst system consisting of a vanadium compound as a main catalyst component and alkyl aluminum compound as a co-catalyst is in general use. When producing the ethylene-propylene-diene copolymer using the above method, a large quantity of catalyst should be used because the ability of the above catalyst is low. In addition, the stability of the catalyst at the reaction temperature of above 50° C. is deteriorated, and then the ability of the catalyst is rapidly decreased, so that there is a limit to the manufacturing process. In addition, the vanadium catalyst has multiple active sites according to the degree of the reduction by the alkyl aluminum co-catalyst, so that the composition distribution of the copolymer produced has not been uniform.

Recently, there are many examples of producing a ethylene-propylene-unconjugated diene copolymer by using the metallocene catalyst having high activity. However, most examples showed the method for copolymerizing by activating the metallocene compound as the main catalyst with a methyl aluminoxane as the co-catalyst. However, when using the above catalyst system, a larger quantity of the co-catalyst should be used, so that economically, the methods are not suitable. In addition, when the polymerization temperature is above 140° C., the activity of the catalyst is rapidly decreased, or the product having high molecule weight is difficulty produced due to the transition reaction of polymer chain by hydrogen located in a beta site of polymer chain from a catalytic metal during the polymerization.

SUMMARY OF THE INVENTION

In order to solve the above mentioned problems, the inventors found that a catalyst system using an activating agent of a compound of aluminium or boron, or aluminoxane together with a catalyst comprising at least one anionic ligand having an aryloxy group substituted with an aryl derivative in the ortho position and a cyclopentadiene derivative provides a highly active polymerization method with outstanding reactivity with respect to ethylene, propylene and diene compounds.

Therefore, an aspect of the present invention provides a method of producing an ethylene-propylene-diene copolymer by using the catalyst of single active site having high activity, in which the catalyst activity can be maintained by using the above catalyst component even in the state of solution polymerization of high temperature.

Hereinafter, the present invention will be described in detail.

The present invention relates to the method of producing the ethylene-butadiene-diene copolymer of which the ethylene content is from 30 wt. % to 80 wt. %, the propylene content is from 20 wt. % to 60 wt. % and the diene content is from more than 0 wt. % to 15 wt. %, under the present of a catalyst composition using an activating agent of a compound of aluminium or boron, or aluminoxane together with a catalyst comprising at least one anionic ligand having an aryloxy group substituted with an aryl derivative in the ortho position and a cyclopentadiene derivative around the transition metal of the central metal of the fourth group of the periodic table.

The diene monomer available for the present invention has more than two double bonds, and the examples include 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, 5-vinyl-2-norborene, 2,5-norbornadiene, 7-methyl-2,5-norbornadiene, 7-ethyl-2,5-norbornadiene, 7-propyl-2,5-norbornadiene, 7-butyl-2,5-norbornadiene, 7-phenyl-2,5-norbornadiene, 7-hexyl-2,5-norbornadiene, 7,7-dimethyl-2,5-norbornadiene, 7-methyl-7-ethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, 5-isopropyl-2-norbornene, 1,4-cyclohexadiene, bicyclo(2,2,1)hepta-2,5-diene, 5-ethylidene-2-norbornene, 5-methylene-2-norbornene, bicyclo(2,2,2)octa-2,5-diene, 4-vinylcyclohexa-1-ene, bicyclo(2,2,2)octa-2,6-diene, 1,7,7-trimethylbicyclo-(2,2,1)heta-2,5-diene, dicyclopentadiene, fetiltetrahydroindene, 5-arylbicyclo(2,2,1)heta-2-ene, 1,5-Cyclooctadiene, 1,4-diarylbenzene, butadiene, isoprene, 2,3-dimethylbutadiene-1,3,1,2-butadiene-1,3,4-methylpentadiene-1,3,1,3-pentadiene, 3-methyl-1,3-pentadiene, 2,4-dimethyl-1,3-pentadiene, 3-ethyl-1,3-pentadiene, and the like, and most preferably, 5-ethylidene-2-norbornene and dicyclopentadiene.

The diene monomer may be selected according to a processing property of the ethylene-propylene-diene copolymer and may be used with more than two diene monomers if need.

[Chemical Formula 1]

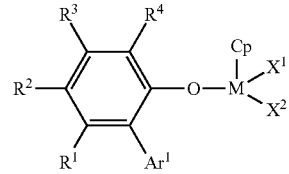

wherein, M is the transition metal of the fourth group of the periodic table;

Cp may be η 5-bonded with the central metal, M, and substituted or unsubstituted fused ring with (C6-C30)ar(C1-C20)alkyl, (C2-C20)alkenyl, (C6-C30)aryl, (C1-C20)alkyl including cyclopentadienyl ring, cyclopentadienyl ring, or substituted or unsubstituted cyclopnedienyl anion with (C6-C30)ar(C1-C20)alkyl, (C2-C20)alkenyl, (C6-C30)aryl, (C1-C20)alkyl;

$R^1$ to $R^4$ is independently hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro, or $R^1$ to $R^4$ may form polycyclic aromatic ring or singlecyclic aromatic ring, and alicyclic ring by bonding (C3-C12)alkylene or (C3-C12)alkenyl with/without fused ring with adjacent substitutes;

$Ar^1$ is (C6-C30)aryl, or (C3-C30)heteroaryl comprising at least one selected from the group consisting of N, O, and S;

$X^1$ and $X^2$ are independently selected from the group consisting of halogen atom, (C1-C20)alkyl, (C3-C20)cycloalkyl, (C6-C30)ar(C1-C20)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, and

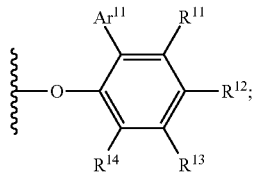

$R^{11}$, $R^{12}$, $R^{13}$, and $R^{14}$ are independently hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro, or $R^{11}$ to $R^{14}$ may form polycyclic aromatic ring or singlecyclic aromatic ring, and alicyclic ring by bonding (C3-C12)alkylene or (C3-C12)alkenylene with/without fused ring with adjacent substitutes;

$Ar^{11}$ is (C6-C30)aryl, or (C3-C30)heteroaryl comprising at least one selected from the group consisting of N, O, and S; and the alkyl, aryl, cycloalkyl, aralkyl, alkoxy, alkylsiloxy, arylsiloxy, alkylamino, arylamino, alkylthio, and arylthio of the $R^1$ to $R^4$, $R^{11}$ to $R^{14}$, and $X^1$ and $X^2$, and the aryl or hetero aryl of $Ar^1$ and $Ar^{11}$ may be further substituted with hydrogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro or hydroxy.

Hereinafter, the present invention will be described in more detail.

The catalyst used for the present invention is the catalyst composition including the catalyst of transition metal represented by the following Chemical Formula 1, and the co-catalyst. The co-catalyst may be selected from a boron compound and an aluminum compound, or may include their mixture.

Firstly, the following Chemical Formula 1 includes at least one aryloxide ligand substituted with an aryl derivative in the ortho position and a cyclopentadiene derivative around the transition metal, and is a catalyst of transition metal of fourth group that is not crosslinked between ligands each other

[Chemical Formula 1]

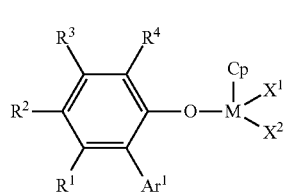

The central metal, M in the catalyst of transition metal of the above Chemical Formula 1 is the transition metal of the fourth group of the periodic table, and preferably titanium, zirconium, or hafnium. In addition, the Cp may be η 5-bonded with the central metal, M, and substituted or unsubstituted fused ring with (C6-C30)ar(C1-C20)alkyl, (C2-C20)alkenyl, (C6-C30)aryl, (C1-C20)alkyl including cyclopentadienyl ring, cyclopentadienyl ring, or substituted or unsubstituted cyclopnedienyl anion with (C6-C30)ar(C1-C20)alkyl, (C2-C20)alkenyl, (C6-C30)aryl, (C1-C20)alkyl. A specific example of substituted or unsubstituted fused ring derivative including cyclopentadiene ring or cyclopentadiene anion is cyclopentadienyl, tetramethylcyclopentadienyl, pentamethylcyclopentadienyl, methylcyclopentadienyl, dimethylcyclopentadienyl, butylcyclopentadienyl, sec-butylcyclopentadienyl, tert-butylmethylcyclopentadienyl, trimethylsilylcyclopentadienyl, indenyl, methylindenyl, dimethylindenyl, ethylindenyl, isopropylindenyl, fluorenyl, methylfluorenyl, dimethylfluorenyl, ethylfluorenyl, isopropylfluorenyl, and the like.

$R^1$ to $R^4$ on arylpenoxide ligand of the above Chemical Formula 1 is independently hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, nitro, or $R^1$ to $R^4$ may form polycyclic aromatic ring or singlecyclic aromatic ring, and alicyclic ring by bonding (C3-C12)alkylene or (C3-C12)alkenylene with/without fused ring with adjacent substitutes;

$Ar^1$ is (C6-C30)aryl, or (C3-C30)heteroaryl comprising at least one selected from the group consisting of N, O, and S;

$X^1$ and $X^2$ are independently selected from the group consisting of halogen atom, (C1-C20)alkyl, (C3-C20)cycloalkyl, (C6-C30)ar(C1-C20)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, and

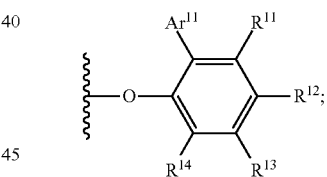

$R^{11}$, $R^{12}$, $R^{13}$, and $R^{14}$ are independently hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, nitro, or $R^{11}$ to $R^{14}$ may form polycyclic aromatic ring or singlecyclic aromatic ring, and alicyclic ring by bonding (C3-C12)alkylene or (C3-C12)alkenylene with/without fused ring with adjacent substitutes;

$Ar^{11}$ is (C6-C30)aryl, or (C3-C30)heteroaryl comprising at least one selected from the group consisting of N, O, and S; and the alkyl, aryl, cycloalkyl, aralkyl, alkoxy, alkylsiloxy, arylsiloxy, alkylamino, arylamino, alkylthio, and arylthio of the $R^1$ to $R^4$, $R^{11}$ to $R^{14}$, and $X^1$ and $X^2$, and the aryl or hetero aryl of $Ar^1$ and $Ar^{11}$ may be further substituted with hydrogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, nitro or hydroxy.

A example of the halogen atom may be fluorine, chlorine, bromine, or iodine atom;

An example of the (C1-C20)alkyl or (C3-C20)cycloalkyl is methyl, ethyl, n-propyl, isopropyl, n-butyl, sec-butyl, tert-butyl, n-pentyl, neopentyl, n-hexyl, n-octyl, n-decyl, n-dodecyl, n-pentadecyl, or n-eicocyl, and preferably methyl, ethyl, isopropyl, or tert-butyl; a example of (C6-C30)aryl may be penyl, naphthyl, anthracenyl, or fluorenyl; an example of (C6-C30)ar(C1-C20)alkyl group may be benzyl, (2-methylphenyl)methyl, (3-methylphenyl)methyl, (4-methylphenyl)methyl, (2,3-dimethylphenyl)methyl, (2,4-dimethylphenyl)methyl, (2,5-dimethylphenyl)methyl, (2,6-dimethylphenyl)methyl, (3,4-dimethylphenyl)methyl, (4,6-dimethylphenyl)methyl, (2,3,4-trimethylphenyl)methyl, (2,3,5-trimethylphenyl)methyl, (2,3,6-trimethylphenyl)methyl, (3,4,5-trimethylphenyl)methyl, (2,4,6-trimethylphenyl)methyl, (2,3,4,5-tetramethylphenyl)methyl, (2,3,4,6-tetramethylphenyl)methyl, (2,3,5,6-tetramethylphenyl)methyl, (pentamethylphenyl)methyl, (ethylphenyl)methyl, (n-propylphenyl)methyl, (isopropylphenyl)methyl, (n-butylphenyl)methyl, (sec-butylphenyl)methyl, (n-tetradecylphenyl)methyl, triphenylmethyl, naphthylmethyl or anthracenylmethyl, and preferably benzyl or triphenylmethylp; an example of (C1-C20)alkoxy may be methoxy, ethoxyl, n-prophoxy, isoprophoxy, n-butoxy, sec-butoxy, tert-butoxy, n-penthoxy, neopenthoxy, n-hexoxy, n-octoxy, n-dodeoxy, n-pentadeoxy or n-eicosoxy, and preferably methoxy, ethoxy, isoprophoxy or tert-butoxyl; an example of (C3-C20)alkylsiloxy or (C6-C30)arylsiloxy may be trimethylsiloxy, triethylsiloxy, tri-n-propylsiloxy, triisopropylsiloxy, tri-n-butylsiloxy, tri-sec-butylsiloxy, tri-tert-butylsiloxy, tri-isobutylsiloxy, tert-butyldimethylsiloxy, tri-n-pentylsiloxy, tri-n-hexylsiloxy, tricyclohexylsiloxy, phenylsiloxy, diphenylsiloxy, or naphthysiloxy, and preferably trimethylsiloxy, tert-butyldimethylsiloxy or phenylsiloxy. In addition, an example of (C1-C20) alkylamino or (C6-C30)arylamino may be dimethylamino, diethylamino, di-n-propylamino, diisopropylamino, di-n-butylamino, di-sec-butylamino, di-tert-butylamino, diisobutylamino, tert-butylisopropylamino, di-n-hexylamino, di-n-octylamino, di-n-decylamino, diphenylamino, dibenzylamino, methylethylamino, methylphenylamino, or benzylhexylamino, and preferably dimethylamino, diethylamino or diphenylamino; and an example of (C1-C20)alkylthio or (C6-C30) may be methylthio, ethylthio, isopropylthio, phenylthio, or naphthylthio.

A specific example of the above Chemical Formula 1 may be selected from the group consisting of the following Chemical Formulas:

[Chemical Formula 1-1]

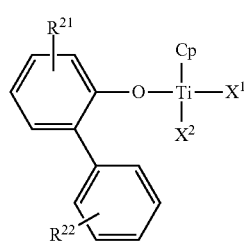

[Chemical Formula 1-2]

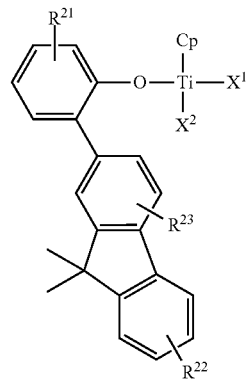

[Chemical Formula 1-3]

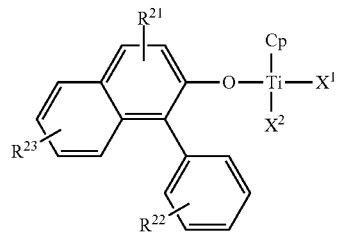

[Chemical Formula 1-4]

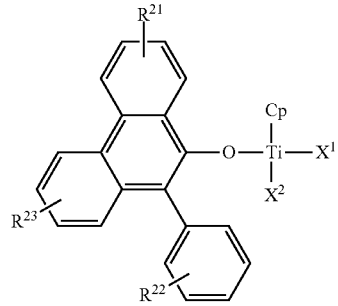

[Chemical Formula 1-5]

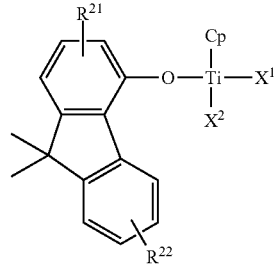

[Chemical Formula 1-6]

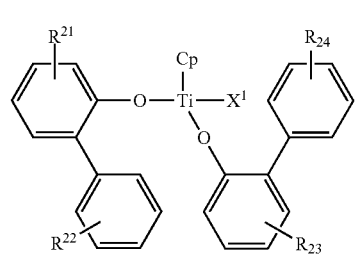

[Chemical Formula 1-7]

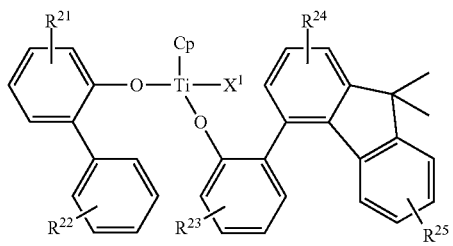

[Chemical Formula 1-8]

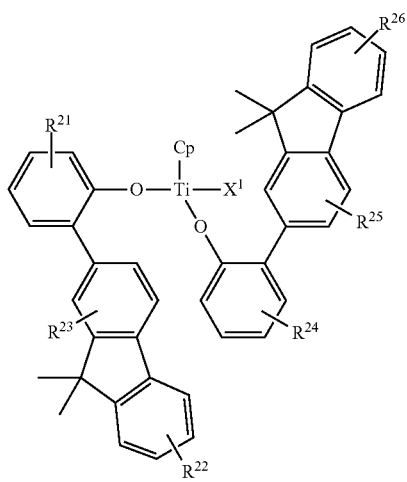

[Chemical Formula 1-9]

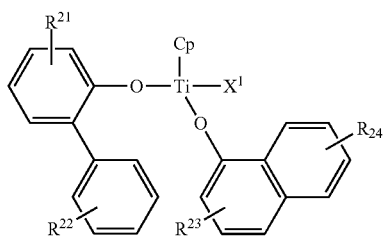

[Chemical Formula 1-10]

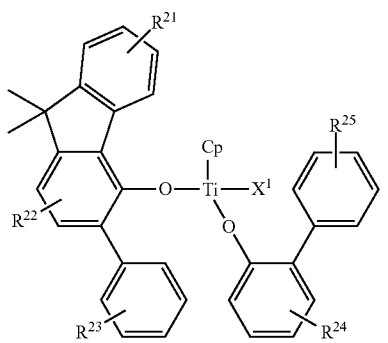

[Chemical Formula 1-11]

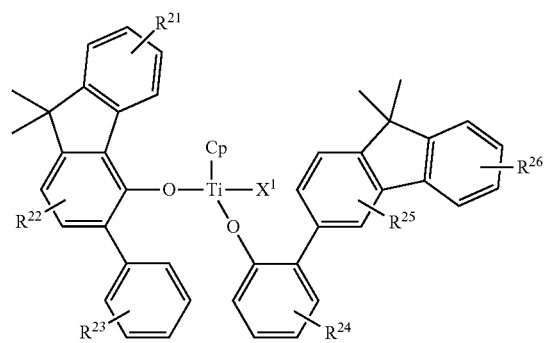

[Chemical Formula 1-12]

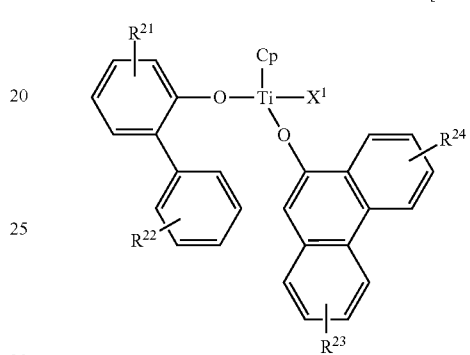

[Chemical Formula 1-13]

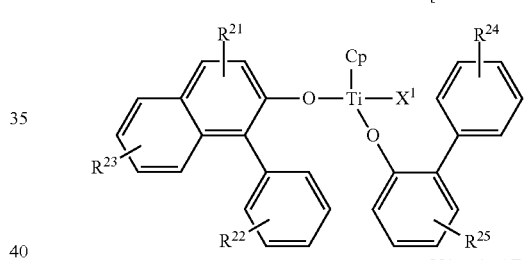

[Chemical Formula 1-14]

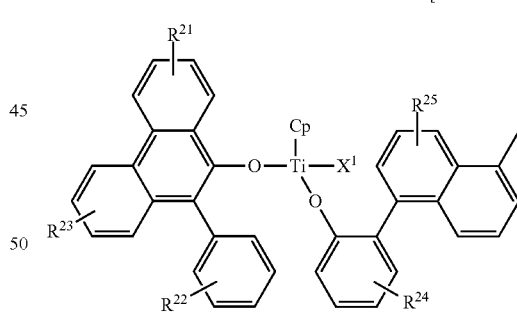

wherein, $R^{21}$ to $R^{26}$ may be independently hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, or nitro, or $R^{21}$ to $R^{26}$ may form polycyclic aromatic ring or singlecyclic aromatic ring, and alicyclic ring by bonding (C3-C12)alkylene or (C3-C12)alkenylene with/without fused ring with adjacent substitutes; the alkyl, aryl, cycloalkyl, aralkyl, alkoxy, alkylsiloxy, arylsiloxy, alkylamino, arylamino, alkylthio, and arylthio of the $R^{21}$ to $R^{26}$ may be further substituted with hydrogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro or hydroxy;

Cp may be η 5-bonded with the central metal, Ti, and substituted or unsubstituted fused ring with (C6-C30)ar(C1-C20)alkyl, (C2-C20)alkenyl, (C6-C30)aryl, (C1-C20)alkyl including cyclopentadienyl ring, cyclopentadienyl ring, or substituted or unsubstituted cyclopnedienyl anion with (C6-C30)ar(C1-C20)alkyl, (C2-C20)alkenyl, (C6-C30)aryl, (C1-C20)alkyl; and the $X^1$ and $X^2$ is methyl or Cl.

More specifically, the present invention provides a method of producing ethylene-propylene-diene copolymer, in which the catalyst of transition metal is selected from the following Chemical Formulas:

[Chemical Formula 1-1-1]

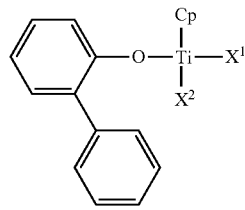

[Chemical Formula 1-1-2]

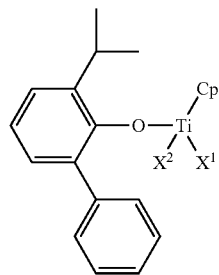

[Chemical Formula 1-2-1]

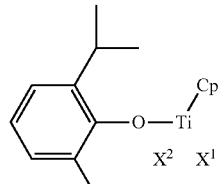

[Chemical Formula 1-3-1]

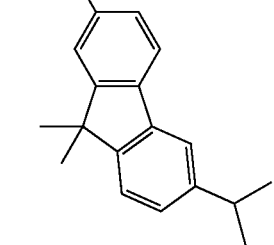

[Chemical Formula 1-4-1]

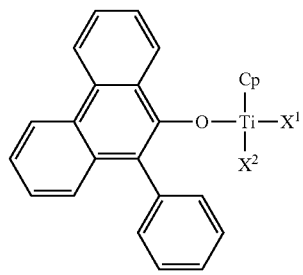

[Chemical Formula 1-5-1]

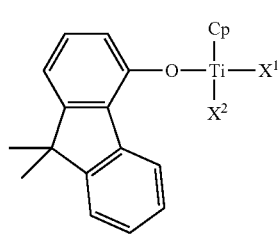

[Chemical Formula 1-6-1]

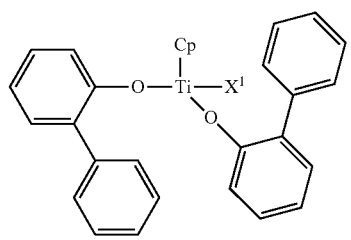

[Chemical Formula 1-6-2]

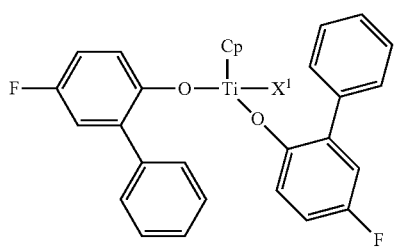

[Chemical Formula 1-6-3]

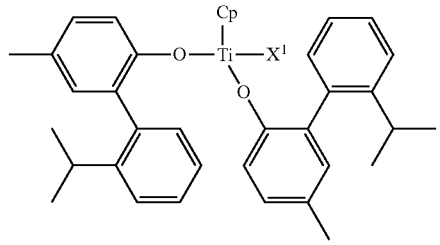

[Chemical Formula 1-6-4]

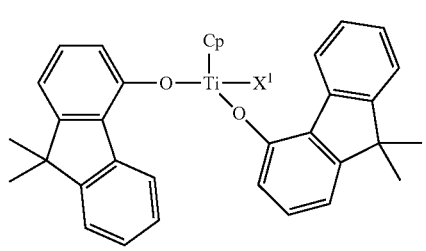

[Chemical Formula 1-7-1]

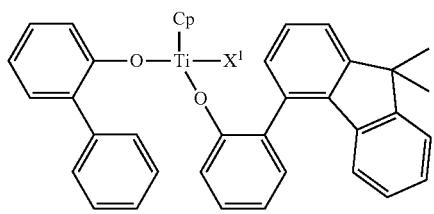

[Chemical Formula 1-8-1]

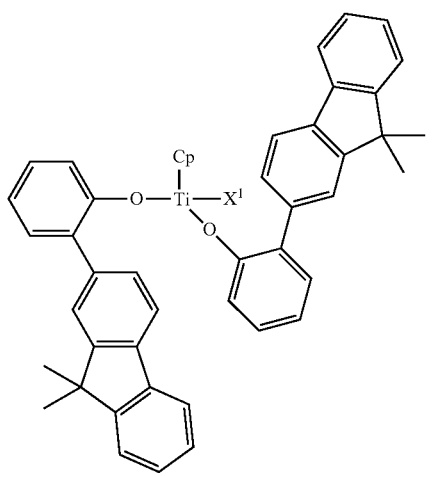

[Chemical Formula 1-9-1]

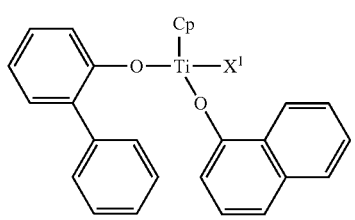

[Chemical Formula 1-10-1]

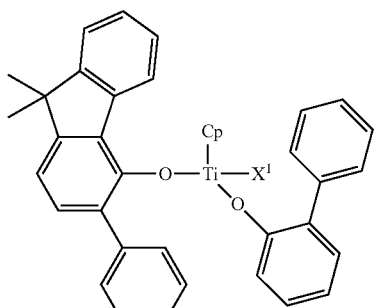

[Chemical Formula 1-11-1]

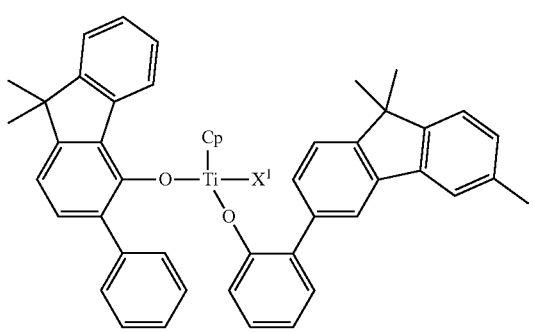

[Chemical Formula 1-12-1]

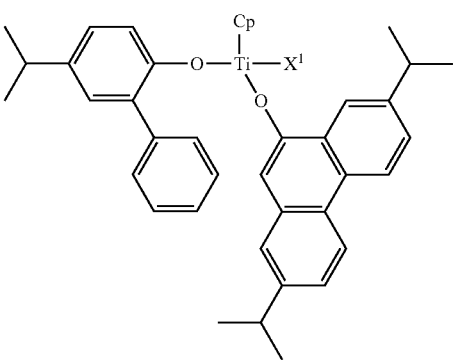

[Chemical Formula 1-13-1]

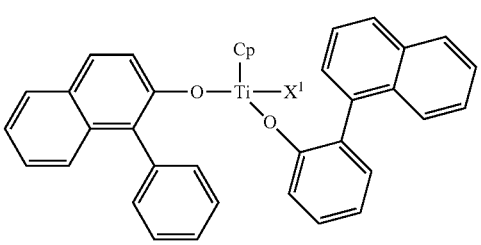

[Chemical Formula 1-14-1]

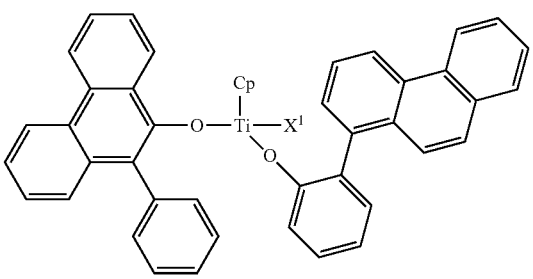

wherein, Cp may be η 5-bonded with the central metal, Ti, and substituted or unsubstituted fused ring with (C6-C30)ar (C1-C20)alkyl, (C2-C20)alkenyl, (C6-C30)aryl, (C1-C20)alkyl including cyclopentadienyl ring, cyclopentadienyl ring and the $X^1$ and $X^2$ is methyl or Cl.

In order to be an component of active catalyst that can be used for olefin polymerization, the catalyst of transition metal having the above Chemical Formula 1 needs to use the aluminum compound or boron compound, or their mixture as the co-catalyst, in which the aluminum compound or the boron compound can act as a counter ion, i.e., anion, having a weak bonding force, while making the central ion to be cation by extracting X ligand from the compound of transition metal according to the present invention. At this point, used organic aluminum compound is to remove a trace polar material that acts as a catalytic poison in the reaction solvent, but may act as an alkylating agent when X ligand is halogen.

According to the present invention, the boron compound that can be used as the co-catalyst can be selected from the compounds represented by the following Chemical Formula 2, Chemical Formula 3 or Chemical Formula 4 as shown U.S. Pat. No. 5,198,401.

$B(R^{31})_3$     [Chemical Formula 2]

$[R^{32}]^+[B(R^{31})_4]^-$     [Chemical Formula 3]

$[(R^{33})_qZH]^+[B(R^{31})_4]^-$     [Chemical Formula 4]

For Chemical Formula 2 to 4, B is boron atom; $R^{13}$ is phenyl, and the phenyl may be further substituted with 3 to 5 substituted group selected from the group consisting of substituted or unsubstituted (C1-C20)alkoxy by fluorine atom, substituted or unsubstituted (C1-C20)alkyl by fluorine atom, or fluorine atom; $R^{32}$ is (C5-C7)cycloalkyl radical or (C1-C20)alkyl(C6-C20)aryl radical, (C6-C30)ar(C1-C20)alkyl radical, for example, triphenylmethyl radical; Z is nitrogen or phosphorous atom; $R^{33}$ is (C1-C20)alkyl radical or substituted anyilinium radical with two (C1-C4)alkyl groups together with nitrogen atom; and q is an integer of 2 or 3.

A preferable example of the boron-based co-catalyst may be tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, tetrakis(pentafluorophenyl)borate, tetrakis(2,3,5,6-tetrafluorophenyl)borate, tetrakis(2,3,4,5-tetrafluorophenyl)borate, tetrakis(3,4,5-tetrafluorophenyl)borate, tetrakis(2,2,4-trifluorophenyl)borate, phenybis(pentafluorophenyl)borate or tetrakis(3,5-bistrifluoromethylphenly)borate. In addition, an example of their specific combination may be ferrocerium tetrakis(pentafluorophenyl)borate, 1,1'-dimethylmerrocerium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluoromethylphenyl)borate, triethylamonium tetrakis(pentafluorophenyl)borate, triprophylamonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bistrifluoromethylphenyl)borate, diisopropylamonium tetrakis(pentafluorophenyl)borate, dicyclohexylamonium tetrakis(pentafluorophenyl)borate, triphenylphosphonium tetrakis(pentafluorophenyl)borate, tri(methylphenyl)phosphonium tetrakis(pentafluorophenyl)borate, or tri(dimethylphenyl)phosphonium tetrakis(pentafluorophenyl) borate, and preferably N,N-dimethylanilinium tetrakispentafluorophenylborate, triphenylmethylinium tetrakispentafluorophenylborate or trispentafluoroborane, and the mole rate of the central metal M:boron atom is preferably 1:0.1~50, and more preferably 1:0.5~15.

As the aluminum compound used for the present invention, the aluminoxane compound of Chemical Formula 5 or Chemical Formula 6, the organic aluminum compound of Chemical Formula 7, or the organic aluminum hydrocarbyloxide compound of Chemical Formula 8 or Chemical Formula 9 can be used.

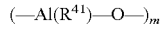  [Chemical Formula 5]

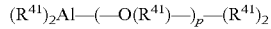  [Chemical Formula 6]

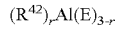  [Chemical Formula 7]

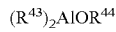  [Chemical Formula 8]

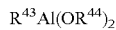  [Chemical Formula 9]

For Chemical Formula 5 to Chemical Formula 9, $R^{41}$ is linear or non-linear (C1-C20)alkyl, preferably methyl or isobutyl, and m and p are an integer of 5 to 20; $R^{42}$ and $R^{43}$ are (C1-C20)alkyl; E is hydrogen atom or halogen atom; r is an integer of 1 to 3; and $R^{44}$ may be selected from the group consisting of (C1-C20)alkyl or (C6-C30)aryl.

A specific example used for the aluminum compound is methylaluminoxane, improved methylaluminoxane, and tetraisobutylaluminoxane as aluminoxane compound; an example of organic aluminum compound is trialkylaluminum comprising trimethylaluminum, triethylaluminum, tripropyl aluminum, triisobutylalumium, and trihexylaluminum; dialkylaluminumchloride comprising dimethylaluminumchloride, diethylaluminumchloride, dipropylaluminumchloride, diisobutylaluminumchloride, and dihexylaluminumchloride; alkylaluminumdichloride comprising methylaluminumdichloride, ethylaluminumdichloride, propylaluminumdichloride, isobutylaluminumchloride, and hexylaluminumdichloride; and dialkylaluminumhydride comprising dimethylaluminumhydride, diethylaluminumhydride, dipropylaluminumhydride, diisobutylaluminumhydride, and dihexylaluminumhydride, and preferably trialkylaluminum, more preferably triethylaluminum and triisobutylaluminum, and at this point, the mole rate of the central metal M:aluminum atom is preferably 1:1 to 1:2,000, more preferably 1:5 to 1:1,000.

In addition, the mole rate of the central metal M:aluminum atom is preferably 1:0.1~50:1~1,000, and more preferably 1:0.5~15:5~500.

The ethylene-propylene-diene copolymer produced by the present invention is composed of at least above 30 wt. %, preferably above 40 wt. % ethylene content; at least above 19.9 wt. %, preferably above 30 wt. % propylene content; and more than 0 wt. %, preferably above 0.1 wt. %-diene content, based on the sum of propylene content and ethylene content. In addition, the copolymer is composed of at most 80 wt. %, preferably less than 75 wt. % ethylene content; at most 60 wt. %, preferably less than 50 wt. % propylene content; and at most 15 wt. %, preferably less than 12 wt. % diene content, based on the sum of ethylene content and propylene content. The range of the weight average molecule weight (Mw/Mn) of the copolymer is 60,000 to 600,000, and the distribution of the molecular weight is 2.0 to 3.0.

Specifically, when producing the ethylene-propylene-diene copolymer, the pressure in the reactor is 1~1000 atmosphere, and more preferably 5~100 atmosphere. In addition, the temperature of the polymerization effectively is 30~300° C., and preferable 50~250° C.

Generally, when the solution polymerization is performed at high temperature as motioned above, the deterioration and modification of the catalyst are generated by the increase of the temperature, so that the activity of the catalyst is decreased and the desired polymer having the desired properties is not obtained. However, when producing the ethylene-propylene-diene copolymer according to the present invention, even thought the range of the temperature is 50~250° C., the stability of the catalyst may be maintained, and more preferably in the range of 80~200° C., the activity of the catalyst is maintained stable.

DETAILED DESCRIPTION OF THE PREFERRED EMBODIMENT

As set forth above, according to exemplary embodiments of the invention, for the method of producing the ethylene-propylene-diene copolymer using the metallocene transition catalyst suggested in the present invention, the rate of the propylene relating to the ethylene among EPDM polymer is similar to the rate of Feed monomer as suggested in Example in the following Table 1, so that the reactivity of the propylene is superior. Also, there is scarcely an un-reacted diene, as compared to ENB conversion ratio (73.1%) of Exxon Mobil that is the company of producing metallocene EPDM as [SRI PEP Review 2005-8] document, so that the reactivity of the diene is superior. Therefore, the method according to the present invention can have a high reaction efficiency, and can maintain a high productivity at high temperature of polymerization, as compared to the existed method of producing the ethylene-propylene-diene copolymer, so that the method according to the present invention is an economical method, and is very useful for industry.

Hereinafter, the present invention will be described in more detail in connection with the exemplary embodiments, but the range of the present invention will not be limited into the following exemplary embodiments.

The copolymer produced by the method of the present invention has various molecular weights according to the conditions of the production. The molecular weight and the distribution of the molecular weight were measured through a gel chromatography including three-phase mix columns. The used solvent was 1,2,4-trichlorobenzene, and the measure temperature was 120° C. In order to evaluate the composition of the copolymer, a specimen of film state was prepared by using a press specimen-making machine, and the rate of ethylene and propylene and the content of diene in the specimen was weighted by using an infrared spectrometer.

Example 1

1L n-hexan was added to a stainless steel reactor having 2L volume, and then 1.4 g improved methyl aluminoxane-7 (AKZO NOVEL, mMAO-7) was injected to the reactor. And then 0.76 of the weight rate of propylene/ethylene adjusting the initial composition was injected until the pressure of the reactor becomes 5 kg/cm$^3$, and then the temperature of the reactor was heated up to 80° C. The reaction was started by successively injecting 5 uM bis(2-penylphenoxy) (pentamethylcyclopentadienyl) titanium (IV) methyl and 50 uM triphenyliumtetrakispentafluorophenylborate (99%, Boulder Scientific). When processing the reaction, ethylene and propylene were continuously supplied according to the initial composition, so that the pressure in the reactor was maintained at 5 kg/cm$^2$. Above 20° C. of reaction temperature was increased due to the exothermic reaction when the reaction began to start, and after 15 minutes, the reaction was stopped by injecting oxygen. After the polymerized solution was precipitated in the sufficient acetone solvent, and then recovered, the vacuumed drying was performed for 12 hours at room temperature to yield 40 g polymer. The weight average molecular weight of the polymer was 70,000 (g/mol), and the distribution degree was 2.5. In addition, the ethylene content of the polymer through the infrared spectrometer was 63%.

Example 2

The same method for Example 1 was used except that 4.1 g 5-ethylidene-2-norbornene (Sigma Adrich) that is a polyene monomer was injected to obtain 96 g polymer. The weight average molecular weight of the polymer was 70,000 (g/mol), and the distribution degree of the polymer was 2.55. In addition, the ethylene content in the polymer through the infrared spectrophotometer was 64%, and ENB content was 4.5%.

Example 3

The same method for Example 2 was used except that the starting temperature of the polymerization was 120° C., to obtain 90 g polymer. The weight average molecular weight of the polymer was 65,000 (g/mol), and the distribution degree of the polymer was 2.8. In addition, the ethylene content in the polymer through the infrared spectrophotometer was 66%, and ENB content was 4.2%.

Example 4

The same method for Example 2 was used except that (dichloro) (pentamethylcyclopentadienyl) (2-9',9"-dimethylfluorene-2'yl)phenoxy)titanium(IV) was used as the main catalyst, to obtain 90 g polymer. The weight average molecular weight of the polymer was 100,000 (g/mol), and the distribution degree of the polymer was 2.7. In addition, the ethylene content in the polymer through the infrared spectrophotometer was 60%, and ENB content was 4.2%.

Comparative Example 1

1L n-hexane was added to a stainless steel reactor having 2L volume, and then 2.3 g 5-ethylene-2-norbornene (Sigma Adrich) and 400 μmol improved ethylaluminumsesquichloride (Sigma Aldrich, EASC) were injected to the reactor. And then 4.60 of the weight rate of propylene/ethylene adjusting the initial composition was injected until the pressure of the reactor becomes 5 kg/cm$^2$, and then the temperature of the reactor was heated up to 50° C. The reaction was started by successively injecting 127 μM vanadiumtrichloride (Sigma Aldrich). When processing the reaction, ethylene and propylene were continuously supplied according to the initial composition, so that the pressure in the reactor was maintained at 5 kg/cm$^2$. Above 7° C. of reaction temperature was increased due to the exothermic reaction when the reaction began to start, and after 15 minutes, the reaction was stopped by injecting ethanol. After the polymerized solution was precipitated in the sufficient acetone solvent, and then recovered, the vacuumed drying was performed for 12 hours at room temperature to yield 13 g polymer. The weight average molecular weight of the polymer was 70,000 (g/mol), and the distribution degree was 3.8. In addition, the ethylene content in the polymer through the infrared spectrophotometer was 68%, and ENB content was 6.5%.

TABLE 1

| | EPDM polymer | | | |
|---|---|---|---|---|
| | Feed monomer | | C3/C2 | ENB Conversion |
| No. | C3/C2 Ratio | ENB(g) | Ratio | ratio (%) |
| Com. Example 1 | 4.6 | 2.1 | 0.47 | 37 |
| Example 1 | 0.76 | 0 | 0.59 | — |
| Example 2 | 0.76 | 4.2 | 0.56 | 94 |
| Example 3 | 0.76 | 4.2 | 0.52 | 90 |
| Example 4 | 0.76 | 4.2 | 0.67 | 90 |

What is claimed is:

1. A method of producing an ethylene-propylene-diene copolymer by using a catalyst composition comprising a metallocene catalyst of transition metal of the following Chemical Formula I:

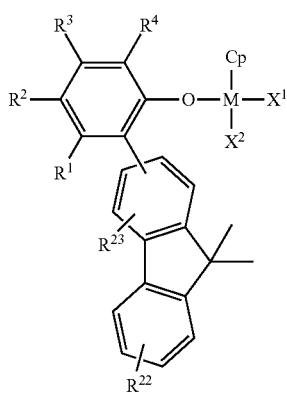

[Chemical Formula I]

wherein, M is the transition metal of the fourth group of the periodic table;

Cp may be η 5-bonded with the central metal, M, and substituted or unsubstituted fused ring with (C6-C30)ar(C1-C20)alkyl, (C2-C20)alkenyl, (C6-C30)aryl, (C1-C20)alkyl including cyclopentadienyl ring, cyclopentadienyl ring, or substituted or unsubstituted cyclopentadienyl anion with (C6-C30)ar(C1-C20)alkyl, (C2-C20)alkenyl, (C6-C30)aryl, (C1-C20)alkyl;

$R^1$ to $R^4$ and $R^{22}$ to $R^{23}$ are independently hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro, or $R^1$ to $R^4$ may form polycyclic aromatic ring or singlecyclic aromatic ring, and alicyclic ring by bonding (C3-C12)alkylene or (C3-C12)alkenyl with/without fused ring with adjacent substitutes;

$X^1$ and $X^2$ are independently selected from the group consisting of halogen, atom, (C1-C20)alkyl, (C3-C20)cycloalkyl, (C6-C30)ar(C1-C20)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, and

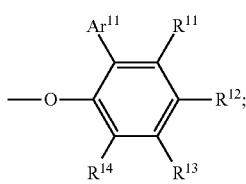

$R^{11}$, $R^{12}$, $R^{13}$, and $R^{14}$ are independently hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro, or $R^{11}$ to $R^{14}$ may form polycyclic aromatic ring or singlecyclic aromatic ring, and alicyclic ring by bonding (C3-C12)alkylene or (C3-C12)alkenylene with/without fused ring with adjacent substitutes;

$Ar^{11}$ is (C6-C30)aryl, or (C3-C30)heteroaryl comprising at least one selected from the group consisting of N, O, and S; and the alkyl, aryl, cycloalkyl, aralkyl, alkoxy, alkylsiloxy, arylsiloxy, alkylamino, arylamino, alkylthio, and arylthio of the $R^1$ to $R^4$, $R^{11}$ to $R^{14}$, $R^{22}$ to $R^{23}$, and $X^1$ and $X^2$, and the aryl or hetero aryl of $Ar^1$ and $Ar^{11}$ may be further substituted with hydrogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro or hydroxy.

2. The method of producing the ethylene-propylene-diene copolymer of claim 1, wherein M of the transition catalyst of the above Chemical Formula I is Ti, Zr or Hf.

3. The method of producing the ethylene-propylene-diene copolymer of claim 2, wherein the catalyst of transition metal is selected from the group consisting of the following Chemical Formulas:

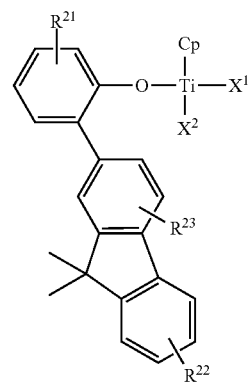

[Chemical Formula 1-2]

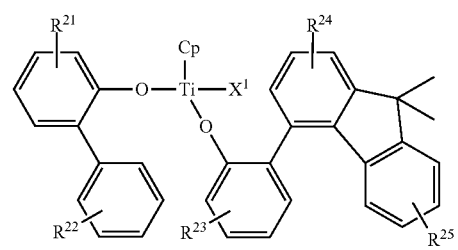

[Chemical Formula 1-7]

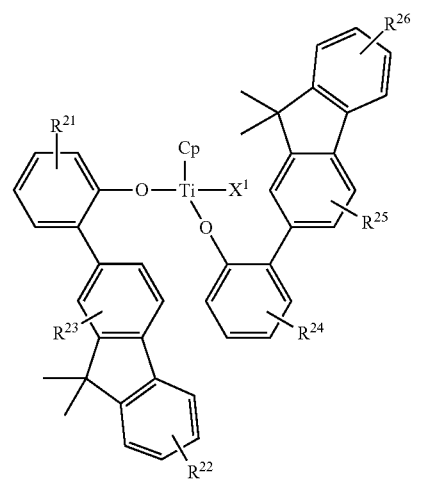

[Chemical Formula 1-8]

-continued

[Chemical Formula 1-11]

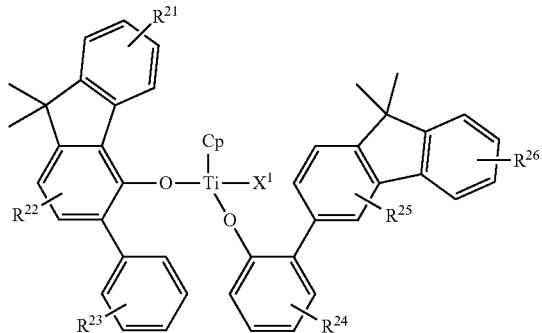

wherein, $R^{21}$ to $R^{26}$ may be independently hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, or nitro, or $R^{21}$ to $R^{26}$ may form polycyclic aromatic ring or singlecyclic aromatic ring, and alicyclic ring by bonding (C3-C12)alkylene or (C3-C12)alkenylene with/without fused ring with adjacent substitutes; the alkyl, aryl, cycloalkyl, aralkyl, alkoxy, alkylsiloxy, arylsiloxy, alkylamino, arylamino, alkylthio, and arylthio of the $R^{21}$ to $R^{26}$ may be further substituted with hydrogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro or hydroxy;

Cp may be η 5-bonded with the central metal, Ti and substituted or unsubstituted fused ring with (C6-C30)ar(C1-C20)alkyl, (C2-C20)alkenyl, (C6-C30)aryl, (C1-C20)alkyl including cyclopentadienyl ring, cyclopentadienyl ring, or substituted or unsubstituted cyclopentadienyl anion with (C6-C30)ar(C1-C20)alkyl, (C2-C20)alkenyl, (C6-C30)aryl, (C1-C20)alkyl; and the $X^1$ and $X^2$ is methyl or Cl.

4. The method of producing the ethylene-propylene-diene copolymer of claim 3, wherein the catalyst of transition metal is selected from the group consisting of the following Chemical Formulas:

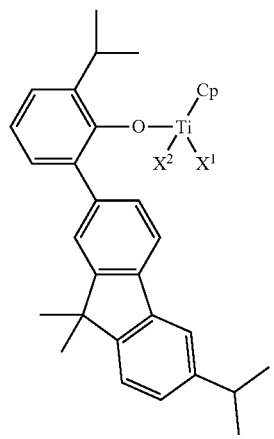

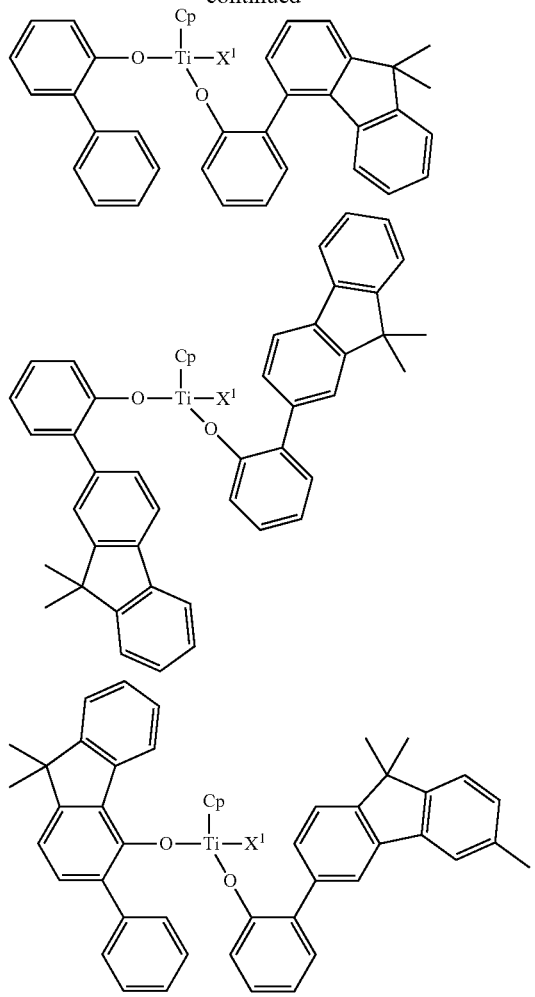

wherein, Cp may be η 5-bonded with the central metal, Ti, and substituted or unsubstituted fused ring with (C6-C30)ar(C1-C20)alkyl, (C2-C20)alkenyl, (C6-C30)aryl, (C1-C20)alkyl including cyclopentadienyl ring, cyclopentadienyl ring, or substituted or unsubstituted cyclopentadienyl anion with (C6-C30)ar(C1-C20)alkyl, (C2-C20)alkenyl, (C6-C30)aryl, (C1-C20)alkyl; and the $X^1$ and $X^2$ is methyl or Cl.

5. The method of producing the ethylene-propylene-diene copolymer of claim 3, wherein the ethylene content is 30~80 wt. %.

6. The method of producing the ethylene-propylene-diene copolymer of claim 3, wherein the propylene content is 19.9~60 wt. %.

7. The method of producing the ethylene-propylene-diene copolymer of claim 3, wherein the polyene content having a double bonding of non-conjugated structure is above 0 to less than 15 wt. %.

8. The method of producing the ethylene-propylene-diene copolymer of claim 7, wherein the polyene content having a double bonding of non-conjugated structure is 0.1~15 wt. %.

9. The method of producing the ethylene-propylene-diene copolymer of claim 3, wherein the reaction pressure is 5~100 atmosphere, and the temperature of polymerization is 50~250° C.

10. The method of producing the ethylene-propylene-diene copolymer of claim 4, wherein the catalyst composition includes the metallocene catalyst of transition metal; and a co-polymer selected from the group consisting of aluminoxane compound, organic aluminum compound, boron compound, and their mixture.

11. The method of producing the ethylene-propylene-diene copolymer of claim 10, wherein the ratio of the metallocene catalyst of transition metal and the co-polymer 1:0.5~15:5~500 based on the mole ratio of the transition metal M:boron atom:aluminum atom.

12. The method of producing the ethylene-propylene-diene copolymer of claim 4, wherein the weight average molecular weight of the copolymer is 60,000 to 600,000, and the distribution of the molecular weight (Mw/Mn) is 2.0 to 3.0.

* * * * *